Dec. 27, 1966  R. BURKHARDT ETAL  3,293,972
MICROTOME
Filed Aug. 23, 1965
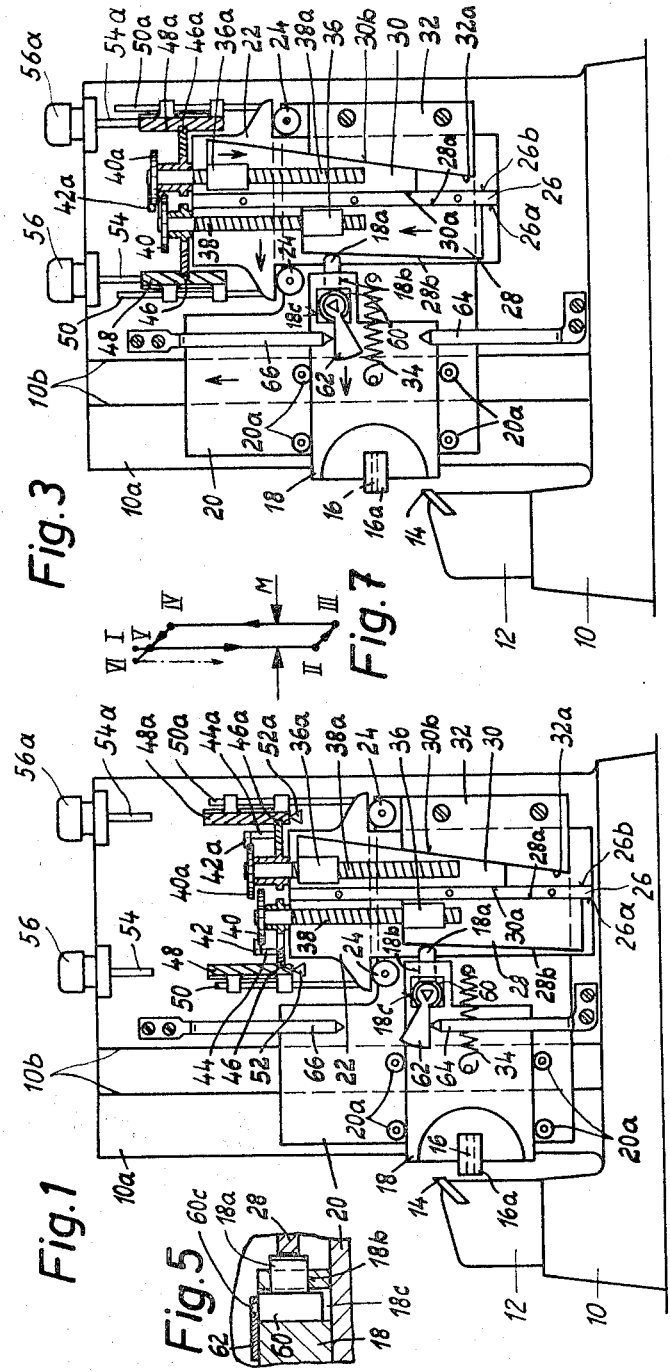
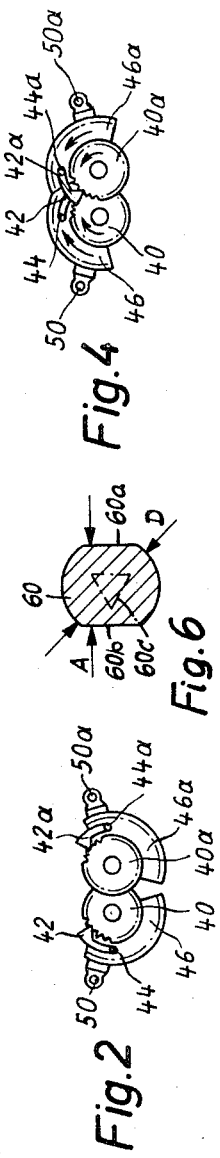

United States Patent Office 3,293,972
Patented Dec. 27, 1966

3,293,972
MICROTOME
Rolf Burkhardt, Munich-Pasing, and Richard Lankes and Anton Imhof, Munich, Germany, assignors to Compur-Werk Gesellschaft mit beschrankter Haftung & Co., Munich, Germany, a firm of Germany
Filed Aug. 23, 1965, Ser. No. 481,671
Claims priority, application Germany, Sept. 8, 1964, C 33,827; Apr. 8, 1965, C 33,898
9 Claims. (Cl. 83—414)

This invention relates to a microtome comprising a knife, a preparation holder which is reciprocable in the cutting direction by means of a main carriage, and an advancing mechanism which is adapted to adjust the preparation holder intermittently or step by step relatively to the knife by a predetermined adjustable advance after each cutting operation. It is the object of the present invention to devise the advancing mechanism of the microtome in such a way that an extremely small thickness of cut, for example, of the magnitude of $1\mu$ may be obtained with the required accuracy and uniformity.

This object is met by the present invention in that the advancing mechanism comprises a wedge which extends in the cutting direction and has, bearing positively against the wedge surface thereof, a projection of a preparation holder which is mounted for displacement in the main carriage, while step indexing mechanism, which is controlled by an abutment and is operatively coupled to the wedge, is adapted to bring about an adjustment of the wedge in the cutting direction, and consequently an advance of the preparation holder relatively to the knife, preferably towards the end of the return movement of the main carriage.

In a preferred embodiment of the invention, and in accordance with a further feature of the latter, the arrangement is such that the wedge and its step indexing mechanism are arranged on an auxiliary carriage which is displaceable on the main carriage in the direction of advance of the preparation holder, which auxiliary carriage is displaceable by means of a further auxiliary wedge which co-operates with a counter surface of the auxiliary carriage and has its wedge surface bearing against a supporting surface arranged on the main carriage, and by means of a further step indexing mechanism which co-operates with the auxiliary wedge and is also mounted on the auxiliary carriage, whereby the total displacement of the preparation holder relatively to the knife is a sum of the advances provided by the two wedges.

It is of advantage to have the pitch of the two wedges of different magnitudes so that one wedge can be used for the coarse adjustment and the other wedge for the fine adjustment of the intermittent or step by step advance of the preparation holder.

It is also of convenience to make the abutment which co-operates with the step indexing mechanism adjustable to enable the size of the advance movement of the preparation holder, effected by means of the wedge, to be varied.

In the case of microtomes of the kind described above, there is a danger that after a cutting operation, and during the return of the preparation holder into the starting position necessary for the next cutting operation, the preparation will scrape over the knife during this return movement and will be damaged by undesirable scratches, blemishes or the like. It is a further object of the invention to guarantee that these shortcomings are avoided. In accordance with the invention this is achieved by the provision of an auxiliary apparatus which is independent of the advancing mechanism and which, on termination of the cutting operation, brings about a lifting of the preparation holder by a small amount from the cutting plane and, towards the end of the return movement of the preparation holder into the next starting position for a cutting operation, produces a restoration of the preparation holder by the same amount into the cutting plane.

In the preferred embodiment of the lifting mechanism, in accordance with a further feature of the invention, the arrangement is such that the auxiliary mechanism has a control pin which is rotatable about its longitudinal axis, is cylindrical, is flattened at least on one longitudinal side, and is held by spring means against the end face of the projection which is displaceable by the preparation holder and is actuated by the advancing mechanism, and abuts against a counter surface on the preparation holder itself.

In this connection it is advantageous if an indexing lever is rigidly connected to the control pin, which lever co-operates alternately with two fixed abutments for the purpose of rotating or indexing the control pin, these abutments being effective towards each end of the reciprocating movement of the preparation holder in the cutting direction.

An example of embodiment of the invention is illustrated in the accompanying drawings and will be described hereunder in detail.

In these drawings:
FIGURE 1 is an elevational view of a microtome,
FIGURE 2 is a plan of a detail of FIGURE 1,
FIGURE 3 shows the microtome in a different operating position,
FIGURE 4 is a detail of the apparatus seen in FIGURE 3, this being shown in plan,
FIGURES 5 and 6 are cross-sections of further details, and
FIGURE 7 is a diagram representing the slide movements.

The microtome is built on a base plate 10 which carries a holder 12 (only shown diagrammatically) for the knife 14. The knife holder is preferably adjustable in all directions and can be clamped in the adjusted position, thus enabling the blade of the knife to be brought to the most suitable position for cutting the preparation.

The preparation 16 is poured into a cylindrical case 16a, which may be made, for example, of plastics material, which case with the assistance of clamping means (not illustrated) is inserted in a preparation holder 18. This holder is, for example, in the form of a carriage which is mounted for displacement in the horizontal direction in roller guideways 20a of a main carriage 20. The main carriage itself is displaceable in the vertical direction on a vertical wall 10a of the base plate 10 in a rectilinear guideway 10b.

Use is made of return springs (not shown) which bias the main carriage 20 into its upper limit position. An upward and downward movement of the main carriage 20, at a constant rate and with a constant stroke, is produced by any suitable drive means well known in the art, for example, by an eccentric cam plate which is power-driven and moves the main carriage 20 in opposition to the return springs downwards in the cutting direction. This provides for a constant up and down movement of the preparation holder 16 relatively to the fixed knife 14 for cutting a plurality of slices of preparation.

Mounted on the main carriage 20 is an auxiliary carriage 22 and this is displaceable in the horizontal direction by means of guide rollers 24 or the like. A bar 26 fastened to the auxiliary carriage 22 and extending in the vertical direction has two parallel bearing faces 26a and 26b. In addition use is made of two wedges 28 and 30 which also extend vertically and have their non-inclined faces 28a and 30a applied against the bar 26 as shown.

The inclined face 30b of the wedge 30 is applied against a counter bar 32 which is secured to the main carriage 20 and the bearing face 32a of which is inclined correspondingly to the inclination of the wedge 30. The face 28b of the wedge 28 is, in contrast, directed towards the preparation holder 18 so that an axial projection 18a of this holder can slide over the wedge surface 28b. A spring 34 which engages the main carriage 20 and the preparation holder 18 forces the projection 18a against wedge 28. This spring, therefore, also insures that both the wedges 28 and 30 are forced against the associated bearing surfaces. The inclination of the two wedges—as can be seen from the drawing—is very small so that there is jamming between the wedges and the bearing surfaces with which they are associated. Thus it is impossible to adjust the wedges under the action of spring 34.

Firmly connected to the wedge 28 is a screw threaded nut 36 in which engages a guide spindle 38. Means (not shown) are provided to anchor this spindle in such a way to the auxiliary carriage 22 that it is only capable of rotation relatively to the latter about its longitudinal axis. An indexing or locking wheel 40 is provided at the smooth end of spindle 38, and an indexing pawl 42 engages in the teeth of this wheel under the action of a spring (not shown). This pawl is pivotally mounted on a pin 44 (FIG. 2) fixed in a segment 46. This segment in turn is mounted for free rotation about the end of the spindle 38 and has, at its periphery, inclined teeth which mesh with correspondingly-inclined teeth on an indexing slide 48. The slide 48 has two eyes which guide it for vertical displacement on a guide rod 50 firmly connected to the auxiliary carriage 22. The lower end face of the slide 48 rests on a fixed stop 52 on the base plate 10a when the main carriage 20 is in its lower limit position. In contrast the upper end surface of the indexing slide 48 cooperates with a control abutment 54 which is adjustably mounted at the upper end of the base plate 10a to provide for an earlier or later movement of the slide 48 during the upward and return movements of the carriage 20. To provide for adjustment in this way a control abutment 54 is, as illustrated, axially displaceable towards the slide 48 by means of a threaded setting knob 56.

It will be understood that instead of constructing the control abutments in this way, a plurality of stepped abutments could be provided and brought selectively into the necessary adjusted positions for cooperation with the indexing slide by displacement or rotation of a setting knob. In any event, however it is of advantage to associate the setting knob 56 for the control abutment 54 with a scale.

The carriage indexing means for the wedge 28 comprising the elements 36 to 54 have already been described. The other wedge has associated therewith similarly-constructed carriage indexing mechanism and for this reason it is unnecessary to describe the analogous construction of this further step indexing mechanism in detail. To provide however for ready visual comparison, the corresponding elements of this further step indexing mechanism carry the same reference numerals as the elements (36 to 54) of the mechanism first described, but with the additional letter a. It should be noted however that the teeth on slide 48a are inclined oppositely to those on slide 48 to permit movement of the wedges as described herein.

The wedge surfaces of the two wedges 28 and 30 have different pitches. As shown by the drawing the wedge 28 has a smaller angle of inclination and is therefore used to produce a fine adjustment of the advance. The wedge 30, in contrast, has a larger angle of inclination and is used for coarse adjustment.

The projection 18a is not rigidly connected to the preparation carriage 18 but is in the form of a flat slide displaceable in the horizontal direction in a guideway 18b on the carriage 18. A cylindrical control pin 60 is inserted in a further horizontal squared guideway 18c of the carriage 18. The diameter of the control pin 60 and the width of the square hole 18c are so chosen relatively to one another that the control pin is rotatably mounted in the square hole (of the cross section of FIGURE 5). The control pin 60 has a flattened portion 60a on one longitudinal side and a flattened portion 60b on the opposite longitudinal side (FIGURE 6). These flats are parallel to one another and to the axis of the control pin. A triangle 60c is provided at the upper end of the control pin 60, this being attached to an indexing lever 62. Moreover, two abutments 64 and 66 are fixedly mounted by means of screws on the frame 10a of the microtome, for co-operation with the lever 62 in a manner which is described in more detail hereinafter.

The microtome described operates as follows:

It is first assumed that in the case illustrated the fine setting and the coarse setting for the preparation holder 18 have been effected by means of the setting knobs 56 and 56a. Consequently both wedges 28 and 30 are effective to bring about an advance, and the total of this advance is obtained by addition of the two individual wedge displacements.

In the uppermost position, that is to say in the starting position for the cutting operation, the microtome elements assume the positions illustrated in FIGURE 3. In the diagrammatic illustration of these movements given in FIGURE 7, this starting position is indicated as Point I. In this position projection 18a bears on the one hand against the wedge face 28b and on the other hand against the cylindrical peripheral surface of the control pin 60. From this starting position, the main carriage 20 is moved downwards by the rising portion of the previously described driving cam against the force of the return springs which have also been referred to above, as a result of which the knife 14 cuts a slice, for example of 1μ thickness (or even thinner), from the preparation 16. Towards the end of the downwards cutting movement the elements reach the position which is indicated in FIGURE 7 as Point II, in which the indexing lever 62 strikes the lower fixed abutment 64 and as a result is pivoted, the control pin 60 turning from the position shown in FIGURE 3 in the clockwise direction into the position of FIGURE 1, that is to say is indexed. In the course of this indexing movement the flat 60a of the control pin 60 engages the projection 18a and the flat 60b engages the opposite surface of the square hole 18c, whereby the preparation carriage 18 can now be retracted under the effect of the spring 34 by a small amount M, from the cutting plane (I to II). This amount M consists of the difference between the diameter D of the control pin 60 and the spacing A between the parallel surfaces 60a and 60b ($M = D - A$). Experience indicates that M should be about 0.5 mm.

After the cutting operation and the succeeding return of the preparation holder, the microtome elements reach the bottom position illustrated in FIGURE 1 and designated by Point III in the diagram of FIGURE 7. The descending portion of the continuously-rotating driving cam then comes into action and, under the effect of the return springs, the main carriage is moved vertically upwards from the position according to FIGURE 1 and from Point III in FIGURE 7. The auxiliary carriage 22 and the preparation holder 18 are carried upwards in the same vertical direction by the main carriage 20 via the guideways 20a and 24. In addition the elements of the two step indexing mechanisms move with the auxiliary carriage 22 along with the indexing slides 48 and 48a which are entrained by the friction in the inclined tooth engagement.

As soon as the microtome elements have been lifted, during the upward movement, sufficiently for the preparation 16 to be brought above the knife 14 again and for the indexing lever 62 to ultimately meet the upper stop 66

(Point IV), the indexing lever 62 is again pivoted in the counter clockwise direction, the control pin 60 is switched from the position in FIGURE 1 into that of FIGURE 3 and the preparation carriage 18 is consequently moved forwards horizontally by the same amount M, that is to say towards the knife 14 (return movement IV to V).

After this return of the preparation carriage 18 into the original cutting plane (I–II) the advancing mechanism, which is actuated by the two wedges and the step indexing mechanism, comes into operation—as will be explained in more detail below—during the end phase of the upward movement, and this moves the preparation carriage 18 from the old cutting plane into a new and perpendicular plane, starting at Point VI and indicated in dotted lines, for cutting the next slice of preparation. This actual advance movement follows the course from Point V to Point VI in reference to the diagram of FIGURE 7, the horizontal distance between Points I–VI corresponding to the amount of advance (? $\geq 1\mu$).

It is assumed that during this last phase of the upward movement of the carriages 18, 20 and 22, which determines the advance movement, the indexing slide 48a strikes the associated control abutment 54a and is thereby prevented from performing any further upward movement, whereas the said carriages continue their upward movement until they reach the uppermost limit position of the main carriage 20. The inclined teeth of the upwardly-propelled segment 46a will thus roll on the inclined teeth of the indexing slide 48a which is held stationary, this causing a rotary movement of the segment 46a during its upward movement in the counterclockwise direction (FIGURE 4). The pawl 42a connected to the segment 46a will therefore turn the locking wheel 40a and thus also the guide spindle 38a in the counterclockwise direction, the result of which is a downwardly directed displacement of the wedge 30 relatively to the auxiliary carriage 22.

Thus the wedge 30 is adjusted in the direction of the arrow indicated in FIGURE 3 and in so doing slides on the counter surface 32a of the support bar 32. In turn this movement brings about a displacement of the central bar 26, and thus also of the auxiliary slide 22 carrying it (together with all of the elements carried thereby) to a slight extent in the lateral direction, that is to say horizontally in relation to the main carriage 20, this being provoked by the action of the rectilinear surface 30a of the wedge 30. It is significant that during this lateral displacement of the auxiliary carriage 22 the wedge 28 is also moved laterally therewith and displaces the preparation holder 18 by the set coarse amount towards the knife 14, this through the projection 18a.

Let it be assumed that the indexing slide 48 has met its abutment 54 a short period after the coarse displacement and during the upward movement of the main carriage 20. The step indexing mechanism 36–52 is now brought into action in a similar manner to move the other wedge 28 slightly upwardly relatively to the auxiliary carriage 22 which is now laterally immovable (see the arrow indicated in FIGURE 3). The projection 18a and the preparation holder 18 are thereby displaced, through the rising wedge surface 28b, laterally, i.e. horizontally relatively to the knife, thus implementing a fine adjustment.

These indexing movements, described above, for advancing the preparation holder towards the knife are performed during the end phase of the upward movement of the main carriage 20, so that in the uppermost limit position of the microtome elements, illustrated in FIGURE 3, both the coarse and also the fine adjustment is performed if both step indexing mechanisms are set for action by the knobs 56 and 56a respectively. Each of the two setting knobs can, of course, be selectively set to zero, the result of which is that the associated indexing slide will not be held during the upward movement of the main carriage. In this event only the wedge which has been brought by its setting knob into an operative position will influence the advance (that is, a fine or coarse advance).

After the upward movement of the main carriage 20 (from Point III to Point VI) has been performed the preparation carriage 18 will also be advanced through the distance M again, and also with the preset displacement towards the knife 14.

It should also be pointed out that towards the end of the downward or cutting movement (I–II–III), the indexing slides 48 and 48a again abut their fixed counter stops 52 and 52a respectively and are held fast while the carriages 18, 20 and 22 still move. There is thus a relative movement between the indexing slides 48 and 48a respectively and their segments 46 and 46a respectively, which produces a return rotation of the segments in the clockwise direction, that is to say oppositely to the arrows marked in FIGURE 4. The pawl 42 and 42a, as the case may be, is brought out of engagement with the associated locking wheel 40 or 40a and is brought idly to its new starting position similar to that of FIGURE 2, the guide spindle 38 or 38a respectively being nonrotatable.

It may be significant that—in contrast to the succession of control operations described in the foregoing example for lifting, restoring and advancing the preparation—the advancing mechanism and the auxiliary apparatus may be so relatively set that the advance itself takes place first and the return of the preparation into the cutting plane does not occur until after this, or alternatively both control operations can be performed simultaneously.

It is clear from the foregoing that with the advance indexing means of the microtome in accordance with the invention, which includes at least one advancing wedge, a very minute advance (fine advance) can be achieved without difficulty in view of the very slight inclination of the wedge face, and consequently an extremely thin slice can be cut from the preparation, for example $\frac{1}{1000}$ mm. thickness, and this with the requisite accuracy and uniformity. By association therewith of a further wedge which determines the coarse adjustment, a larger thickness of cut can if required be achieved by addition of the two displacements, or removal of the unrequired parts of the preparation can be implemented rapidly with the assistance of coarse discs.

Moreover, the preparation is retracted a slight amount M from the cutting plane by means of the auxiliary apparatus according to the invention after each cutting operation and before the return of the preparation holder to the starting position required for the next cutting operation. The preparation moving into the starting position for the cutting of a new slice passes the knife with a clearance corresponding to this amount, thus avoiding undesirable scraping, damage, or the like to the leading face of the preparation. Immediately after the preparation has gone past the knife during the retracting movement, however, the preparation is automatically reset by the auxiliary mechanism by the same amount M.

The sign $\mu$ used in the foregoing description means one thousandth of a millimeter.

Obviously many modifications and variations of the present invention are possible in light of the foregoing teachings. What is claimed as new and is desired to be secured by Letters Patent is:

1. A microtome comprising a base, a knife mounted on said base, a main carriage reciprocable on said base, a preparation holder reciprocable towards and away from the knife on said main carriage, and advancing means for advancing the preparation holder in relation to the knife, said advancing means including a wedge, a projection on the preparation holder engageable with the wedge, and a step indexing mechanism operatively associated with the wedge for adjusting the position of the wedge whereby the preparation holder is advanced relative to the knife, an auxiliary carriage mounted on said main carriage for movement in the direction of advance of the preparation holder, a supporting surface on the auxiliary carriage and a counter bar on the main carriage, a second wedge bearing against the supporting surface and against the counter bar and a second indexing means cooperating with the second wedge whereby the total displacement of the preparation holder is the sum of the advances provided by the two wedges.

2. A microtome according to claim 1 wherein the first and second wedges have different pitches.

3. A microtome comprising a base, a knife mounted on said base, a main carriage reciprocable on said base, a preparation holder reciprocable towards and away from the knife on said main carriage, and advancing means for advancing the preparation holder in relation to the knife, said advancing means including a wedge, a projection on the preparation holder engageable with the wedge, and a step indexing mechanism operatively associated with the wedge for adjusting the position of the wedge whereby the preparation holder is advanced relative to the knife, means associated with the preparation holder for moving the preparation holder away from the cutting plane by a predetermined amount at the end of the cutting operation and for moving the preparation holder into the cutting plane towards the end of the return movement of the holder to the starting position.

4. A microtome according to claim 3 wherein said last named means includes a control pin engageable with the projection, a curved surface and a flat surface on the pin and means for rotating the control pin to bring the flat surface or the curved surface into engagement with the projection.

5. A microtome according to claim 4 wherein said rotating means comprises an index lever on the control pin and a pair of fixed abutments engageable with the index lever towards the end of the reciprocating movement of the preparation holder in the cutting direction.

6. A microtome comprising a base, a knife mounted on said base, a main carriage, means mounting the carriage for reciprocating movement on the base, a preparation holder slidable on the main carriage toward and away from the knife, an auxiliary carriage slidable on said main carriage, a supporting surface on the auxiliary carriage, a first wedge on the auxiliary carriage having a noninclined face engageable with the supporting surface, a counter bar mounted on said main carriage and having an inclined face engageable with the inclined face of the first wedge, a second wedge on the auxiliary carriage having a noninclined face engageable with the supporting surface, a projection on the preparation holder, the end of the projection engageable with the inclined face of the second wedge and step indexing means for said first and second wedges for moving said wedges and advancing the preparation holder towards the knife.

7. A microtome according to claim 6 wherein the first and second wedges have different pitches.

8. A microtome according to claim 6 and further including means associated with the preparation holder for moving the holder away from the cutting plane by a predetermined amount at the end of the cutting operation and for moving the preparation holder into the cutting plane towards the end of the return movement of the holder to the starting position.

9. A microtome comprising a base, a knife mounted on said base, vertical guideways on said base, a main carriage having portions engageable in said guideways, means for reciprocating the carriage on said base, roller means on said carriage, a preparation holder engageable with the roller means and slidable towards and away from the knife, an auxiliary carriage slidable on said main carriage, a bar secured to said auxiliary carriage and disposed parallel to said guideways, a first wedge on the auxiliary carriage having a noninclined face engageable with one side of the bar, a counter bar mounted on said main carriage and having an inclined face engageable with the inclined face of the first wedge, a second wedge on the auxiliary carriage having a noninclined face engageable with the other side of the bar, a projection on the preparation holder, the end of the projection engageable with the inclined face of the second wedge, means for sliding the projection inwardly and outwardly with respect to the preparation holder, said last named means including a control pin abutting the inner end of the projection, the control pin having flat and curved surfaces, an indexing lever secured to the control pin, abutments engageable with the indexing lever mounted on the base so that when the carriage is reciprocated on the base the indexing lever rotates the control pin whereby the projection alternately engages the flat and curved surfaces of the pin and is moved inwardly and outwardly alternately with respect to the preparation holder, and step indexing means for said first and second wedges, said means including nuts on the wedges engageable with spindles and means for rotating the spindles, said last named means comprising indexing wheels on the spindles, indexing pawls engageable with the indexing wheels, said pawls being pivotally mounted on toothed segments freely rotatable about the spindles, indexing slides engageable with the toothed segments, said indexing slides being slidably mounted on the auxiliary carriage, and control abutments adjustably mounted on the base and engageable with the indexing slides whereby when the main carriage moves in one direction on the base to bring the control abutments into engagement with the indexing slides, the toothed segments are rotated to cause the pawls to drive the indexing wheels to rotate the spindles, and abutment means on the base engageable with the indexing slides to return the slides to the initial position thereof when the main carriage moves in the opposite direction on the base.

References Cited by the Examiner
UNITED STATES PATENTS

| | | | |
|---|---|---|---|
| 1,026,280 | 5/1912 | Ott | 83—409 |
| 2,948,190 | 8/1960 | Blum | 83—915.5 X |

ANDREW R. JUHASZ, *Primary Examiner.*